United States Patent [19]
Buetow

[11] 3,775,254
[45] Nov. 27, 1973

[54] PURIFICATION OF LOW MOLECULAR WEIGHT ENZYMES

[75] Inventor: Ralph William Buetow, Wausau, Wis.

[73] Assignee: Johan Bjorksten, Madison, Wis.

[22] Filed: Oct. 16, 1970

[21] Appl. No.: 81,391

[52] U.S. Cl. .................................. 195/66 R, 195/68
[51] Int. Cl. ............................................ C07g 7/02
[58] Field of Search.......................... 195/62, 66, 68; 210/22

[56] References Cited
UNITED STATES PATENTS
3,228,876  1/1966  Mahon................................. 210/22
FOREIGN PATENTS OR APPLICATIONS
642,653  9/1950  Great Britain....................... 195/63

OTHER PUBLICATIONS

Ensign, et al., Characterization of a Small Proteolytic Enzyme Which Lyses Bacterial Cell Walls, J. of Bacteriology, Vol. 91, No. 2, 2/1966, (Pp. 524–534) QR1J8.
Michaels, A. S., Ultrafiltration, Amicon Corporation, Lexington, Mass., 3/1968 Booklet No. 905 (Pp. 12–23).
Dixon, et al., Enzymes, Academic Press Inc., N.Y., 1964, 2nd Ed. (Pp. 12, 13 & 29–49). QP. D5eC, 2.
Cowman et al., Temperature–Dependent Association–Dissociation of "Streptococcus Lactis," Intracellular Proteinase, Biochemical and Biophysical Research Communications, Vol. 23, 1966 (Pp. 799–803) QR501B43.

*Primary Examiner*—David M. Naff
*Attorney*—Johan Bjorksten

[57] ABSTRACT

For preparation of an enzyme, the enzyme containing solution is passed through an ultrafilter passing only material having a molecular weight lower than 10,000; a soluble form of a bivalent non-toxic cation is added to it, and this cation is precipitated as a carbonate in the enzyme solution; the enzyme is selectively adsorbed to the said carbonate when so precipitated. The carbonate with the adhered enzyme is recovered for example on a filter or by centrifugation and may be washed and/or dried as such, or treated with acid for recovery of the pure enzyme. The metal carbonate complex of the enzyme is particularly suitable for therapeutic purposes because of its high ability and the ready availability of the enzyme upon contact with stomach acid.

11 Claims, 1 Drawing Figure

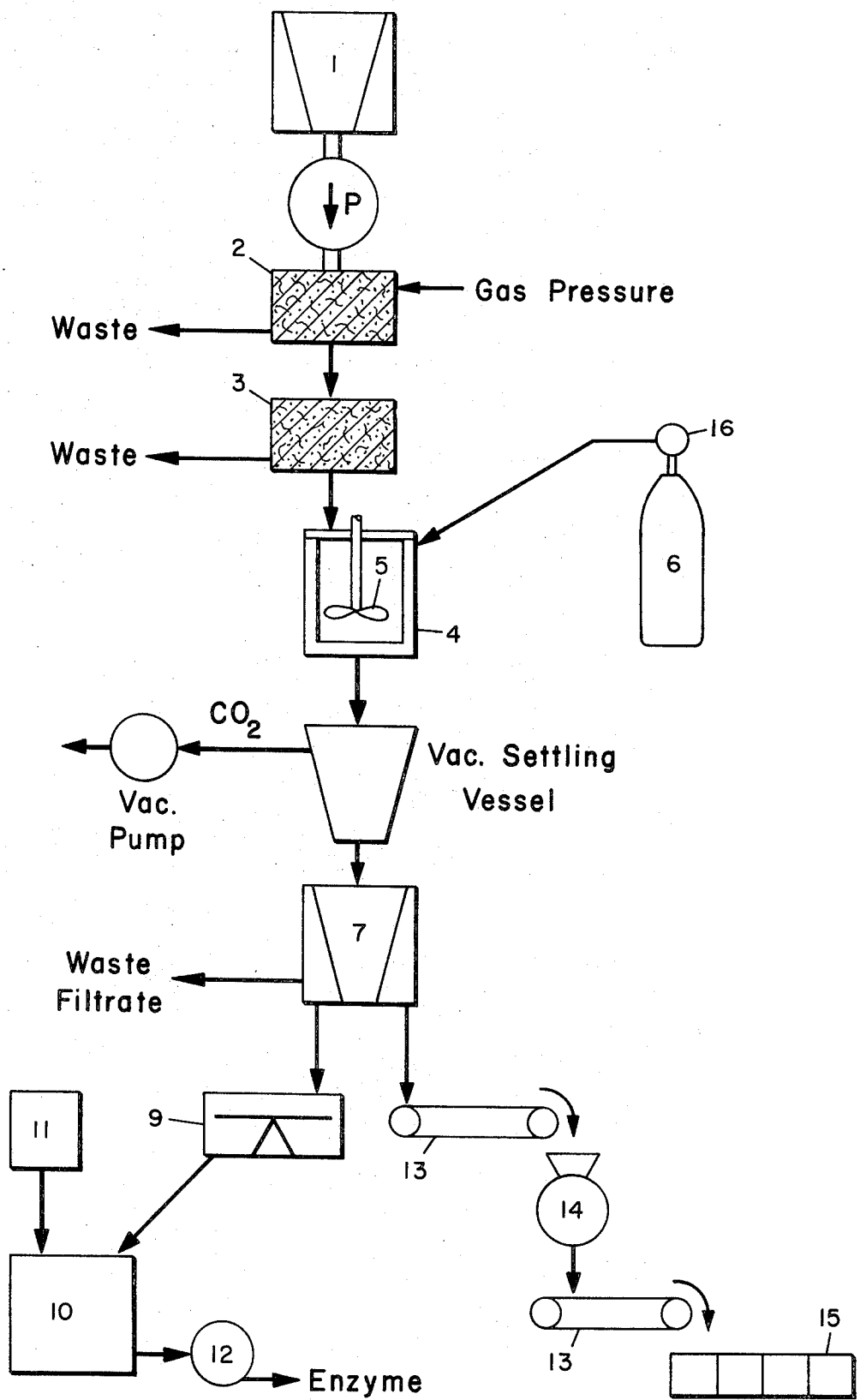

PURIFICATION OF LOW MOLECULAR WEIGHT ENZYMES

PRIOR ART

Enzymes have previously been purified by adsorption processes including particularly surface active clays, alumina, kaolin and the like.

Applicant is not aware of any previous work done on enzyme adsorption in which metal carbonates have been solubilized with carbon dioxide under pressure, and then precipitated and/or redissolved by changes of $CO_2$ pressure to effect purification of enzymes by selective adsorption.

Very low molecular enzymes can be extremely unstable in solution, and require special methods. This is particularly true of many preparations of enzymes having a molecular weight below 10,000, such as those disclosed and claimed in the co-pending application of Bjorksten and Weyer, Ser. No. 83,523 Filed Oct. 23, 1970 for Enzyme Preparation and Products.

OBJECTS OF THE INVENTION

To find an economically feasible method for the preparation of substantial quantities of enzymes having molecular weights under 10,000

To produce low molecular enzymes in quantity and at low cost.

To prepare stable, technically and therapeutically useful preparations of low molecular enzymes.

Further objects will become apparent as the following detailed description proceeds.

BRIEF DESCRIPTION OF THE INVENTION

In order to concentrate and/or separate enzyme from a dilute solution, such as a fermentation broth, a press juice, autolysate or macerate of vegetabilic or animalic origin, I first subject this solution to an ultrafiltration through a membrane or membranes which retain all molecules larger than mol. wt. 10,000. This step is unique in the art, because it has been and is still generally assumed that all enzymes have molecular weights well above 10,000, so that the ordinary person skilled in the art of enzyme purification would be convinced that no activity can pass through such a membrane.

I have found this to be an error, and am basing my process on such precleaning, with ultrafiltration removal of all components having a molecular weight higher than 10,000 —that is a removal from all previously known enzymes.

I then add to the filtrate from this step a non-toxic bivalent cation in a soluble form, or solubilize it after addition, and precipitate it in the broth, preferably as a carbonate. This nascent bi- or polyvalent metal carbonate adsorbs selectively the very low molecular enzymes with which this application is concerned.

THE DRAWING

Reference is made to the drawing, which is a diagrammatic flow sheet representing a typical embodiment of the invention.

DETAILED DESCRIPTION

Referring to the FIGURE, the crude enzyme solution which may be for example a fermentation broth, or an extract, press-juice, macerate or autolysate of vegetabilic or animalic origin is freed by filtration or centrifugation, 1, from solid suspended matter. The resultant liquid is then forced by gas or hydraulic pressure through an ultrafilter, 2, which retains everything having a molecular weight larger than about 30–50,000. This is not necessary for the process, though it is useful in relieving the load on the following filter 3, thus extending its useful life between cleanings.

This filter 3 is an ultrafilter such as "Amicon-10" obtained from the Amicon Corporation, 21 Hartwell Avenue, Lexington, Mass., which retains everything having a molecular weight above 10,000. This is essential to my process. It removes all enzymes known to the published or generally known prior art, so that according to the status of this art no enzyme should be present in the filtrate from this filter.

Nonetheless, contrary to all published prior art, I have found that considerable enzyme activity, which may be as high as ⅓ of the total activity, is present in the filtrate and can be readily concentrated more than a thousand fold for example by adsorption to a nascent precipitate of a selectively enzyme adsorbent solid substance. Since the adsorption is maximal when the particles are very small, an ultrafilter such as Amicon, UM-2, which retains everything having a molecular weight above 1,000 is eminently suitable for this purpose, though other means for separating the enzyme adsorbate may be used, such as ordinary filtration, centrifugation and any other equivalent process. In the particular embodiment shown in the illustration, an earth alkali carbonate (for example calcium, strontium or barium carbonate) is added to the filtrate in vessel 4, agitated by stirring or shaking means 5, while carbon dioxide is being added from cylinder 6, equipped with pressure regulating means 16. When the carbonate has been dissolved completely, which usually requires 5–60 minutes, the $CO_2$ pressure is released, and a vacuum is applied to remove dissolved carbon dioxide. If necessary, a water soluble organic solvent boiling below about 180° C is added to accelerate the precipitation of the enzyme-carbonate complex.

This is then gathered on separating means 7, which may be an ultrafilter preferably cutting off at Mol. Wt. 1,000, or any other filter, centrifuging means or equivalent capable of separating the enzyme-carbonate adsorbate.

This may then be further processed, either by drying, to provide a very stable carbonate complex of an otherwise quite sensitive enzyme, or by elution, for example by addition of acid, to release the enzyme which if necessary can be further purified by conventional methods known to prior art and/or lyophilized for more permanent storage. In the former case, conveyor 13 moves the enzyme-carbonate complex to drying means 14, for example a vacuum drum dryer, and a packaging means 15; while in the latter case the complex is measured at 9, for example by weighing, or automatic assay, mixed in vessel 10 with a quantity of acid adequate to bind the metal component and release the enzyme. The acid is measured in from supplying means 11. The released enzyme is lyophilized at 12.

Having thus explained the principle, I shall further illustrate it with specific examples.

EXAMPLE I

A strain of Bac. cereus, having NRRL number B 3869 was grown in a culture medium composed of 5 grams per liter of Bactopeptone, 3 grams per liter yeast extract, 1 gram per liter beta-d-glucose made up to 1 liter with tap water under the following conditions: 34° C temperature, agitation 350 rpm, air flow 2 liters per minute, time approximately 72 hours.

The resultant broth was filtered first through an Amicon PM-30 filter to remove molecules larger than 30,000 Mol. Wt., and then through an Amicaon PM-10 filter to remove all molecules larger than 10,000 Mol. Wt. This includes removal of all enzymes known to prior art.

To 350 ml of this filtrate was added 0.35 grams of zinc carbonate. The composition was agitated with introduction of carbon dioxide under 80 psi pressure, until all of the zinc carbonate was dissolved. This required 45 minutes. The carbon dioxide pressure was then released, and the composition placed under a vacuum for ½ hour to remove dissolved carbon dioxide. Acetone was added in volume equal to that of the composition, in order to facilitate separation of the carbonate. The product was left to separate 8 hours. pH was 7.

After standing overnight, the precipitate was removed by ultrafiltration on an Amicon UM-2-membrane. The wet precipitate gave a Congocoll assay number of 20, showing that a 100-fold concentration had taken place.

The Congocoll assay employed was a modification of the method of Nelson, et al., "A Rapid Method for the Quantitative Assay of Proteolytic Enzymes," Analytical Biochemistry, Vol. 2, pp. 39–44 (1961), and was carried out as follows: To an appropriate test tube (13 ×100 mm size is best) add 20 mg finely ground (through No. 80 mesh) Congocoll. Add to the tube 0.1 M tris buffer, pH 7.2, to a volume equal to 1.0 ml minus the enzyme sample size; i.e., if a 0.1 ml enzyme sample is to be tested, first add 0.9 ml tris buffer. Also, prepare a blank to which the samples will be compared by adding 1.0 ml tris buffer to an additional Congocoll filled tube. Immediately place tubes in shaker water bath for 30 minutes at 30° C. After incubation, immediately dilute contents with 5 ml 0.1 M tris buffer, pH 7.2. Shake and filter through No. 1 Whatman filter paper to remove congocoll. Read collected filtrates at 495 mu balanced against blank.

The assay numbers at the various steps of the process were as follows:

| | |
|---|---|
| Original broth (Fermenter II) | 1.16 |
| Broth after separation of all ingredients having Mol. W. >10,000 | 0.15 |
| Wet carbonate-enzyme | >20 |
| Dry carbonate-enzyme | >200 |

EXAMPLE 2

A strain of Bac. Cereus, having NRRL number B 3869 was grown in a culture medium composed 5 grams per liter of BactoPeptone, 3 grams per liter of yeast extract, 1 gram per liter beta-d-glucose made up to 1,000 ml tap water, under the following conditions: 36° C temperature, agitation 350 rpm, air flow 2½ liters/minute, time 65 hours. Cells were removed by Sharples centrifugation.

The resultant broth was filtered first through an Amicon PM 30 filter to remove the bulk of large molecules above 30,000 Mol. Weight) and then through an Amicon PM 10 filter to remove all molecules larger than 10,000 Mol. Wt. This includes removal of all hydrolases known to prior art.

To 500 ml of this filtrate was added 60 milligrams calcium carbonate. The product was then placed under 70 psi $CO_2$ pressure in a 5 gallon stainless steel container, and agitated under this pressure at 1° C for 1 hour. The container was then evacuated, and maintained under vacuum ½ hour with continued agitation, for removal of the carbon dioxide, whereupon 500 ml acetone, precooled to 1° C were added. In 3 minutes the solids had sedimented. About 95% of the supernatant liquid was drawn off clear with a siphon having its end bent upward to minimize bottom suction. The remainder was filtered on a Whatman No. 2 filter on a 1 inch sintered glass funnel, and dried in desiccator. The yield was 780 mg of wet precipitate.

3 mg of this precipitate was tested with Congocoll as in Example 1. The activity of this quantity was $A_{495}$ 1.80. On re-testing 2 months later, the activity had not changed.

A 10 mg sample of the wet precipitate, having a solids content of 10%, was stored in a sealed vessel in cold room at 1° C. In 6 days the activity had dropped to 40% of the initial activity. The remainder of the preparation was dried in vacuum desiccator over silica gel. This preparation was stable. On storage without special precautions at room temperature, the activity was unchanged on rechecking after 50 days.

This stable low molecular enzyme preparation is active as such, and is also active as a stable product slowly releasing enzyme particularly in slightly acidic media. The pH optimum appears to be fairly broad, with good activity around pH 7. It is particularly useful for the hydrolytic breakdown of proteinaceous substances where steric hindrances impede the action of large molecular enzymes.

It appears essential for the present purification method to precipitate the solid adsorbent in the enzyme containing solution. When solid, finely dispersed zinc carbonate, or calcium carbonate was added to the fermentation broth, and the solubilization and subsequent precipitation steps omitted, hardly any enzyme activity was adsorbed on the carbonate, from fermentation broth filtrates identical with those of the above examples.

My process has resulted in several hundred fold concentration increase of enzyme content after removal by the initial ultrafiltration of all enzyme activity due to enzymes having molecular weights above 10,000.

The ultrafilter No. PM-10 membranes were checked after the enzyme filtration by filtering 0.2% solutions of Cytochrome C (Mol. Wt. 12,400), and Lysozyme, the lowest molecular enzymes available to us (Mol. Wt. 14,500). None of these penetrated the ultrafilter membrane, from which we conclude that this had not been damaged but was functioning properly.

While the ultrafiltration step preferably is carried out at the beginning of the process, as in the above example, I can also carry out the precipitation step first, elute the adsorbed enzymes, and then carry out the ultrafiltration for selective separations of the very low molecular enzymes.

While I have disclosed certain specific conditions in the xamples, by way of illustration and not of limitation, I have found that the invention is capable of considerable variation.

The most essential part of the invention resides in the discovery that enzymes can be separated by a method which as an essential step comprises ultrafiltration which will effectively remove all hydrolytic enzymes previously known to exist, as no hydrolytic enzyme having a molecular weight less than 10,000 has even before been reported in the literature.

This ultrafiltration step may be followed by adsorption of the enzyme or active enzyme fragment I have found to be still present, on a solid medium which is precipitated out in the presence of the very low molecular enzyme. Particularly suitable solid adsorbants are the earth alkali carbonates, magnesium carbonate and aluminum carbonates, which all are effective adsorbents when dissolved under carbon dioxide pressures of 2 to 2,000 psi, and reprecipitated by removal of the excess carbon dioxide. These adsorbents can be used to advantage in percentages from 0.01% to 10% by weight of the total mix. The resultant carbonate-enzyme complex can be dried for storage or the enzyme can be liberated by elution, and lyophilized in accordance with practices well known in the art. These complexes appear indefinitely stable on storage dry at room temperatures.

The elution may be carried out for example by resolubilizing the carbonate with $CO_2$ pressure, or by cautious addition of dilute acid solution, for example by placing the enzyme adsorbate in an atmosphere into which an acid such as for example maleic, acetic, hydrofluoric or hydrochloric is slowly evaporating: or by having the dilute acid pass through the adsorbate in a column. However, in these elution steps we have invariably lost some activity, and where compatible with the end use we therefore prefer to use the enzyme in the adsorbed state, substantially as obtained from the concentration process of example 2. The resultant product then contains a hydrolase having molecular weight between 1,000 and 10,000 and preferably between 3,000 and 7,500, and a carbonate of a metal selected from te group consisting of earth alkali metals, zinc, magnesium and aluminum, said hydrolase preparation being stable when dry and being active at pH 7. For therapeutic purposes I prefer to employ a hydrolase being adsorbed to a non-toxic metal carbonate, such as a carbonate of calcium, magnesium or aluminum.

The pure enzyme can be liberated by redissolving the metal carbonate adsorbate in water under $CO_2$ pressure, then passing the resultant liquid through an ultrafilter with cut-off at 1,000 to 3,000 mol. weight, so that the dissolved carbonate passes through, while the pure enzyme remains on the filter.

The enzymes thus liberated have molecular weights within the range 1,000 – 10,000; more often 3,000 – 7,500. Molecular weight of 6,400 has been found several times in protease concentrates made from fermentation broths of different microorganisms, for example NRRL B-3867; B-3868; B-3871; B-3872; B-3880. These are highly active on casein as well as on the Congocoll assay methods. The above organisms are available to the public from the type collection of the U.S. Department of Agriculture, Northern Utilization Research & Development Division, Peoria, Ill.

While most of the work on which this application is based has been done with proteases, and found to apply to these quite generally, it may also be applicable to cellulases, amylases, lipases, catalase, peroxidase, peptidases, particularly in the presence of proteases, since these tend to excise some active groups in the course of attack on other enzymes. It is believed to apply to virtually all enzymes because they all have active groups connected with large aggregates, which can be pared down by proteases without destroying the active configurations.

Regardless of whether or not this is the actual mode of action, it is clear that there is utility as well as novelty in the present method which makes available in a practical way active and stable enzyme preparations having very much smaller molecules than known by prior art, and therefore capable of greater penetration into sterically difficulty accessible sites or structures. Fields of utility include, but are not limited to, for example, hydrolysis of waste products, stain removal, and therapeutic uses.

Having thus disclosed my invention, I claim.

1. The method for concentrating a protease, which comprises the steps of passing a crude protease solution through at least one ultrafilter membrane retaining substances of molecular weight exceeding 10,000 to produce a filtrate containing said protease; adsorbing the protease in said filtrate by adding a carbonate of the group selected from earth alkali metals, magnesium and aluminum, in quantity of 0.01 to 10% on the total quantity in process; solubilizing by agitating under a elevated $CO_2$ pressure; precipitating after removal of carbon dioxide by depressurizing; separating and drying the resultant carbonate - protease complex.

2. The method of claim 1, in which the carbonate used is calcium carbonate and the carbon dioxide pressure used for solubilizing it is between 2 and 2,000 psi.

3. The method of claim 1, in which the carbonate is magnesium carbonate and the carbon dioxide pressure used for solubilizing it is between 2 psi and 2,000 psi.

4. The method of claim 1, in which the crude protease solution is first filtered through an ultrafilter retaining material having a molecular weight range of 30,000 to 50,000; then through an ultrafilter retaining substances of molecular weight exceeding 10,000, whereafter the filtrate passing through both of these filters is exposed to an in situ precipitated enzyme adsorbent selected from the class consisting of calcium carbonate, zinc carbonate, magnesium carbonate and aluminum carbonate, separating washing and drying the resultant protease-carbonate complex.

5. The method of claim 2, in which the aforesaid metal carbonates are added in a proportion of 0.01 to 10% by weight on the crude protease containing solution, dissolved by agitation under $CO_2$ pressure in the range of 2 – 2,000 psi, and reprecipitated by removal of carbon dioxide.

6. The method of claim 3, in which a water miscible organic solvent having a boiling point below 180° C is added to facilitate the separation of the nascent metal carbonate.

7. The method of claim 3 in which the said carbonate is calcium carbonate, and the said $CO_2$ pressure is 2 – 2,000 psi, the said $CO_2$ removal is by application of vacuum for 10–30 minutes and the said solvent is acetone in quantity equal to the volume of the water present.

8. The method for concentrating a protease which comprises the steps of passing a fermentation broth of a microorganism through an ultrafilter membrane retaining substances of molecular weight exceeding 10,000 to produce a filtrate containing said protease, adding to said filtrate a carbonate selected from the group consisting of earth alkali-metals, magnesium and aluminum, solubilizing said carbonate by carbon dioxide pressure, precipitating said dissolved carbonate in the presence of said protease by withdrawal of said carbon dioxide pressure and separating the resultant protease carbonate complex.

9. The method of claim 8 in which said organism is a strain of *Bacillus cereus*.

10. The method of claim 9, the said carbonate being calcium carbonate.

11. The method of claim 9, a water miscible organic solvent being added to fac